US010216950B2

(12) United States Patent
Androulaki et al.

(10) Patent No.: US 10,216,950 B2
(45) Date of Patent: Feb. 26, 2019

(54) MULTI-TIERED FILE LOCKING SERVICE IN A DISTRIBUTED ENVIRONMENT

(71) Applicant: International Business Machines Corporation, Armonk, NY (US)

(72) Inventors: Elli Androulaki, Zurich (CH); Robert B. Basham, Aloha, OR (US); Martin Petermann, Zurich (CH); Harold J. Roberson, II, Rochester, MN (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 14/965,974

(22) Filed: Dec. 11, 2015

(65) Prior Publication Data

US 2017/0169236 A1    Jun. 15, 2017

(51) Int. Cl.
*G06F 21/00* (2013.01)
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| 5,175,852 A | 12/1992 | Johnson et al. |
| 5,202,971 A | 4/1993 | Henson et al. |
| 6,651,123 B1 | 11/2003 | Hutchison et al. |
| 2004/0019660 A1* | 1/2004 | E .............................. G06F 9/52 709/219 |
| 2008/0168458 A1* | 7/2008 | Fachan ................... G06F 9/526 718/104 |

(Continued)

FOREIGN PATENT DOCUMENTS

| EP | 0278312 A2 | 8/1988 |
| EP | 1187017 A2 | 3/2002 |
| WO | 2012170004 A1 | 12/2012 |

OTHER PUBLICATIONS

Abou et al., "Two phase locking concurrency control in distributed database with N-tier architecture", International Conference on Electrical, Electronic and Computer Engineering, p. 149-153, 2004.

*Primary Examiner* — Alexander Lagor
*Assistant Examiner* — Syed M Ahsan
(74) *Attorney, Agent, or Firm* — Martin & Associates, LLC; Derek P. Martin (57) ABSTRACT

A multi-tiered file locking service provides file locking at the thread and process level, and can optionally include locking at the file system level. A local locking mechanism maintains a list of local locks for threads within a process. When a thread requests a lock for a file, and a local lock is obtained, a process lock for the file may be requested. When no file system locking is used, when the process lock is obtained, the thread receives the lock for the file. When file system locking is used, when the process lock is obtained, a file system lock for the file may be requested. When the file system lock for the file is obtained, the thread receives the lock for the file. The result is a file locking service that functions across threads, processes and nodes in a distributed computing environment.

11 Claims, 7 Drawing Sheets

(56) References Cited

U.S. PATENT DOCUMENTS

| | | | |
|---|---|---|---|
| 2010/0122253 A1* | 5/2010 | McCart | G06F 8/458 |
| | | | 718/100 |
| 2012/0259820 A1 | 10/2012 | Patwardhan | |
| 2013/0024436 A1 | 1/2013 | Erofeev | |
| 2013/0332910 A1 | 12/2013 | Ganai | |

* cited by examiner

```
lock(application_id, filename) {
get_inode_from_filename()    — 1100
blockThisProcess()           — 1110
blockOtherProcesses()        — 1120
getFileLevelLock()           — 1130
}
```

FIG. 11

```
blockThisProcess() {
get_mutex_lock_on_inode_list()
is_inode_already_in_list? then
Fail_Lock_Request()
put_inode_into_inode_list()
free_mutex_lock()
}
```

FIG. 12

```
blockOtherProcesses() {
get_file_descriptor_for_filesystem_locking_file()
offset_of_fcntl_lock = inode_number
length_of_fcntl_lock = 1
attempt_to_get_fcntl_write_lock()
- unsuccessful then Fail_Lock_Request()
}
```

FIG. 13

```
getFileLevelILock() {
use_DMAPI_Request_Right_Api_to_get_shared_right_on_inode()
- unsuccessful then Fail_Lock_Request()
}
```

FIG. 14

MULTI-TIERED FILE LOCKING SERVICE IN A DISTRIBUTED ENVIRONMENT

BACKGROUND

1. Technical Field

This disclosure generally relates to locking of files in computer systems, and more specifically relates to locking of files in a distributed environment.

2. Background Art

Computer files often need to be accessed by different software applications. Various file locking schemes have been developed over the years to control access to computer files. One well-known locking scheme uses advisory locks, also known as FCNTL locks, to control access to computer files. Known FCNTL locks work well for different processes to access a file, but are unsuitable for different threads in the same process.

In a distributed computing environment such as a cloud computing environment, file locking needs to account for locking at the thread level, locking at the process level, and locking at the file system level. Known solutions do not provide all of these levels of locking in an integrated solution.

BRIEF SUMMARY

A multi-tiered file locking service provides file locking at the thread and process level, and can optionally include locking at the file system level. A local locking mechanism maintains a list of local locks for threads within a process. When a thread requests a lock for a file, and a local lock is obtained, a process lock for the file may be requested. When no file system locking is used, when the process lock is obtained, the thread receives the lock for the file. When file system locking is used, when the process lock is obtained, a file system lock for the file may be requested. When the file system lock for the file is obtained, the thread receives the lock for the file. The result is a file locking service that functions across threads, processes and nodes in a distributed computing environment.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Figure 2:
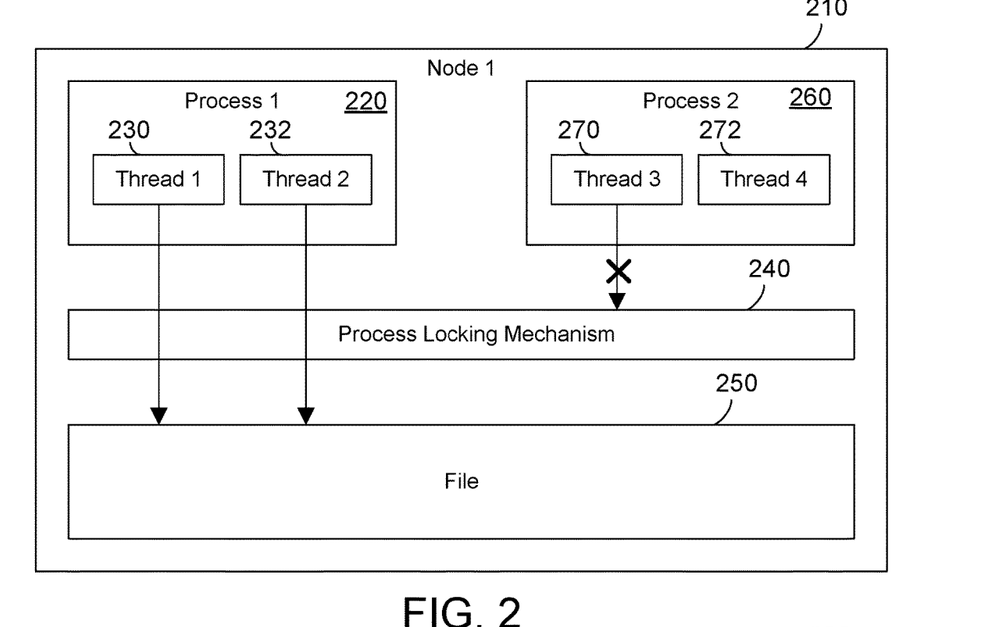
FIG. 2 is a block diagram showing issues with known process locking.
Figure 3:
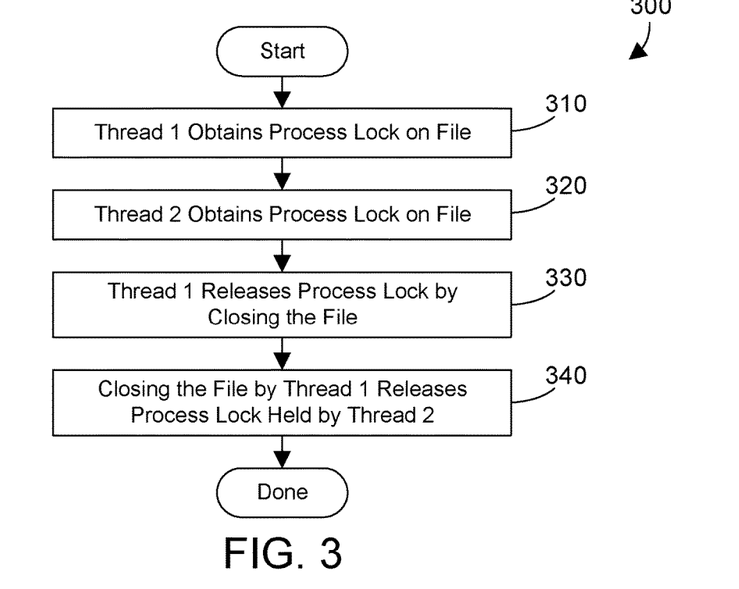
FIG. 3 is a flow diagram of a method that shows some of the issues of the file system locking shown in FIG. 2.

As discussed in the Background section above, one well-known scheme for locking files uses advisory locks, also known as FCNTL locks, to control access to computer files between processes. Known FCNTL locks work well for different processes to access a file, but are unsuitable for different threads in the same process. FIGS. 2 and 3 show some of the problems using FCNTL locks.

Referring to FIG. 2, a node 210 represents a computer system, which runs a first process 220 and a second process 260. The first process 220 includes two threads 230 and 232, while the second process 260 includes two more threads 270 and 272. A process locking mechanism 240 represents a known FCNTL locking mechanism that controls access to a file 250. FCNTL locks are bound to processes and not file descriptors. This means FCNTL locks cannot distinguish between different threads within the same process, and when a thread closes an open file descriptor, it will release all the FCNTL locks for that process. A simple example shows some of the issues that arise with using FCNTL locks.

Let's assume thread 1 230 obtains a process lock on file 250 by requesting the lock to file 250 from the process locking mechanism 240, which determines the file lock is available, and grants the file lock to process 1 220 that runs thread 1 230. This is represented as step 310 in FIG. 3. Now let's assume thread 2 232 requests the lock to file 250 from the process locking mechanism 240. Because process 1 220 already has the FCNTL lock, and thread 2 232 is executed by process 1 220, the file system locking mechanism 240 shows that thread 2 232 already has a process lock on the file. This is shown as step 320 in FIG. 3. Because the FCNTL locks are at the process level of granularity, FCNTL locks cannot be used to distinguish between threads in the same process. Thus, in steps 310 and 320, both threads 230 and 232 have obtained the process lock on the file. When a thread in a different process, such as thread 3 270, attempts to obtain a lock on the file 250 when process 1 220 holds the lock on the file 250, the attempt by thread 3 270 to obtain the file system lock to file 250 will fail, as shown by the X in FIG. 2. This demonstrates that FCNTL locking works well between processes, but not between threads within a process.

Because the FCNTL locks for thread 1 230 and thread 2 232 are bound to process 1 220, when one of the threads releases the lock, the lock held by the other thread is also released. Referring to FIG. 3, when thread 1 230 releases its lock on file 250 by closing the file (step 330), the closing of the file 250 by thread 1 230 causes the process locking mechanism 240 to release the lock held by thread 2 232 as well (step 340). Essentially, closing the file by any process releases locks for all threads run by that process. FIGS. 2 and 3 thus show two undesirable characteristics of FCNTL locks, namely: 1) they cannot distinguish between threads within a process; and 2) closing the file by a process releases all locks on the process. This behavior causes the known FCNTL locking to lack the needed functionality for a distributed computing solution, such as a cloud computing solution.

A multi-tiered file locking service provides file locking at the thread and process level, and can optionally include locking at the file system level. A local locking mechanism maintains a list of local locks for threads within a process. When a thread requests a lock for a file, and a local lock is obtained, a process lock for the file may be requested. When no file system locking is used, when the process lock is obtained, the thread receives the lock for the file. When file system locking is used, when the process lock is obtained, a file system lock for the file may be requested. When the file system lock for the file is obtained, the thread receives the lock for the file. The result is a file locking service that functions across threads, processes and nodes in a distributed computing environment.

Figure 1:
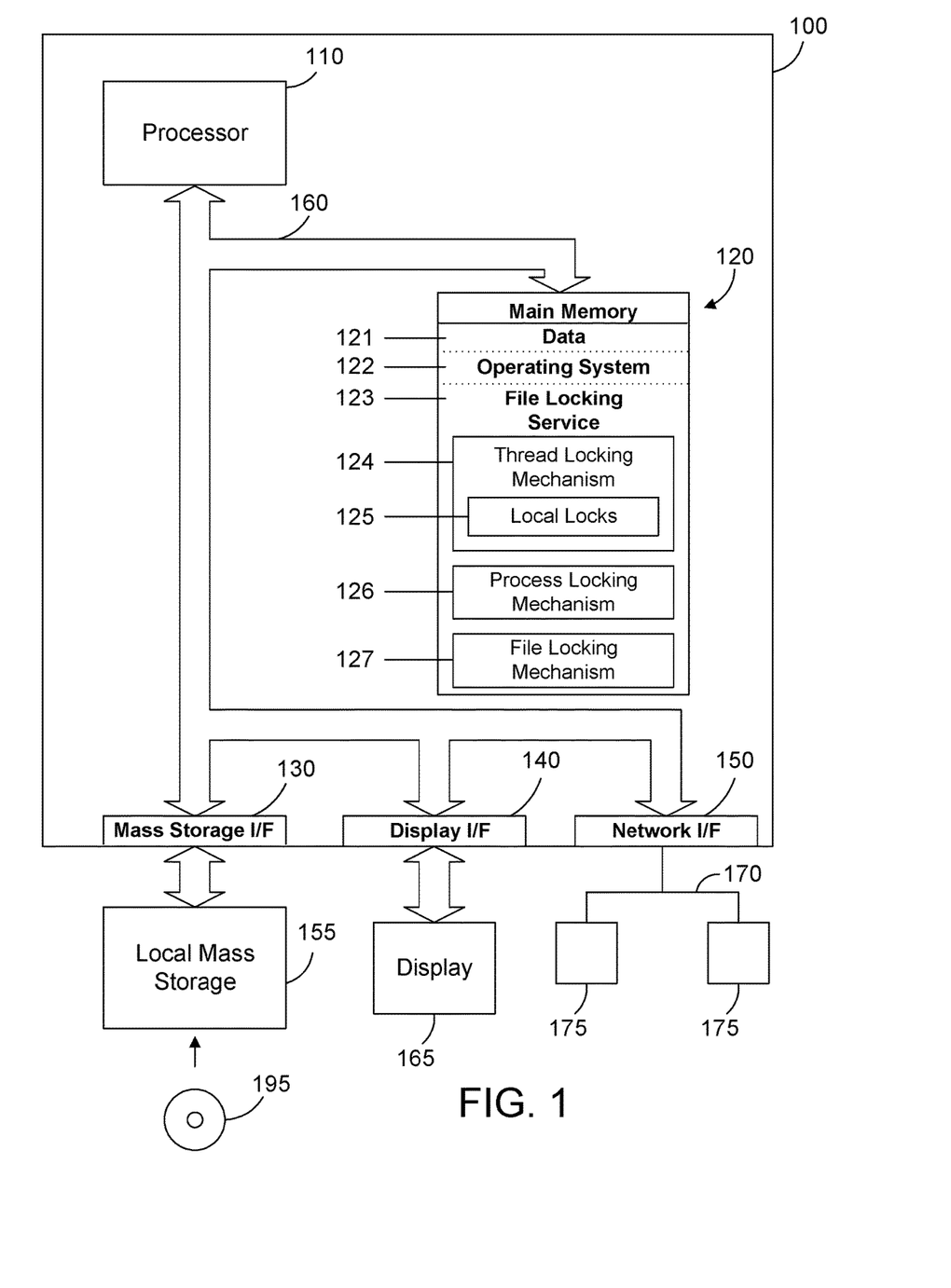
FIG. 1 is a block diagram of a computer system that includes a file locking service.

Referring to FIG. 1, a computer system 100 is one suitable implementation of a server computer system that includes a file locking service as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a file locking service 123. Data 121 represents any data that serves as input to or output from any program in computer system 100. Operating system 122 is a multitasking operating system that supports virtualization, such as AIX or LINUX. File locking service 123 includes a thread locking mechanism 124 that includes local locks 125, a process locking mechanism 126 and may optionally include a file locking mechanism 127. The thread locking mechanism 124 and process locking mechanism 126 use advisory locks. In one suitable implementation, the process locking mechanism 126 could be an FCNTL mechanism implemented by a file system in the operating system 122. In one suitable implementation, the file locking mechanism 127 could be a known file locking mechanism that uses mandatory locks, such as a Data Management API (DMAPI) locking mechanism as known in the art.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and file locking service 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the file locking service 123.

Although computer system 100 is shown to contain only a single processor and a single system bus, those skilled in the art will appreciate that a file locking service as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

Figure 4:
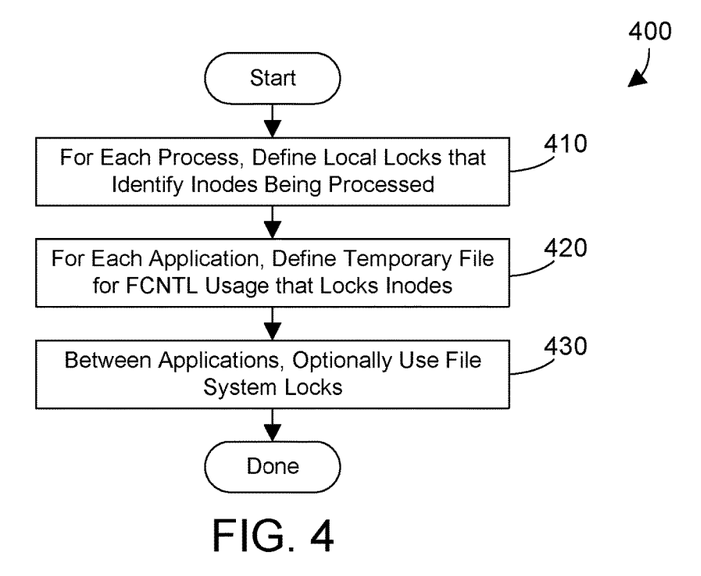
FIG. 4 is a flow diagram of a method for providing a multi-tiered file locking service that functions across threads, processes and nodes in a distributed computing environment.

Referring to FIG. 4, a method 400 is preferably performed by the file locking service 123 shown in FIG. 1 to provide a multi-tiered locking service. Method 400 starts by defining for each process local locks that identify inodes being processed by threads in that process (step 410). Inodes are nodes within a distributed file system, such as the General Parallel File System (GPFS) developed by IBM. The local locks allow distinguishing between different threads being executed by a process. Then for each application, a temporary file is defined for FCNTL usage that locks the inodes (step 420) between processes. Finally, between applications, file system locks may optionally be used (step 430). DMAPI file system locks are known, and could be used in step 430. File system locks are used to prevent applications that are not using the file locking service 123 from accessing the file when the file is locked by another application. The result is a locking service that provides locks at the thread, process and application levels so locking of files can be performed at all levels in a distributed environment.

Figure 5:
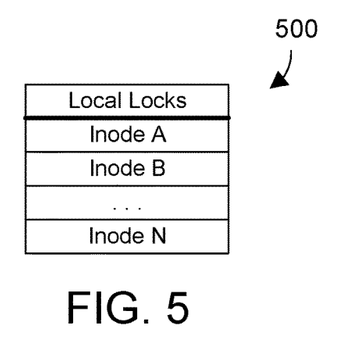
FIG. 5 is a table showing one suitable implementation for local locks between threads within a process.

Referring to FIG. 5, a table 500 shows one suitable implementation for local locks that are defined and processed in step 410 in FIG. 4. The table 500 is a list of local locks for a process that includes a list of inodes being currently processed by any thread in the process. When an inode appears on the list of local locks 500, this means a thread already has a lock on that inode, which means the requested lock is not available. When a lock is requested for an inode and the inode does not appear on the list of local locks 500, this means the requested lock is available, so the inode is written to the list of local locks 500. Note that access to the table 500 of local locks is controlled using a mutex lock so only one thread at a time can access the table. Thus, when a thread requests a lock of a file, it obtains the mutex lock on the local locks table 500, determines whether the inode corresponding to the file is in the list of local locks, and if not, the inode corresponding to the file is written to the list of local locks, and the mutex lock for the local locks 500 is released.

Figure 6:
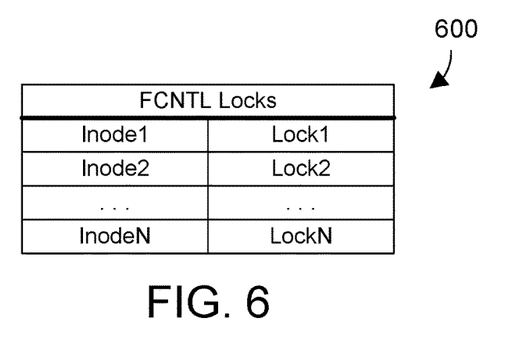
FIG. 6 is a table showing one suitable implementation for process locks between processes in an application.

One suitable implementation of a temporary file for FCNTL usage in step 420 in FIG. 4 is shown at 600 in FIG. 6. Each application preferably has its own FCNTL table 600 as shown in FIG. 6. FCNTL locks are obtained by locking the inode number of the file being processed, for a length of one byte. So inode 1 will lock byte 1, inode 2 will lock byte 2, inode 999 will lock byte 999, etc. This locking file 600 has no data associated with it, which means it is a zero length file. This single file can be used to simultaneously gate access to billions of other files. To avoid known issues with FCNTL locking, the file 600 is opened once, and then never closed for the life of the file locking service. This avoids the problems associated with known FCNTL locks.

Figure 7:
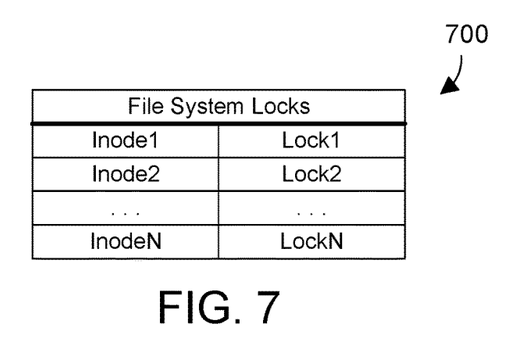
FIG. 7 is a table showing one suitable implementation for file system locks between applications.

One suitable implementation of file system locks is shown in FIG. 7 to include a table 700 of file system locks that correlate each inode to a corresponding lock. File system locks 700 could include known file system locks, such as DMAPI locks, which are mandatory locks that prevent other applications from reading or writing a file when the file is locked.

Figure 8:
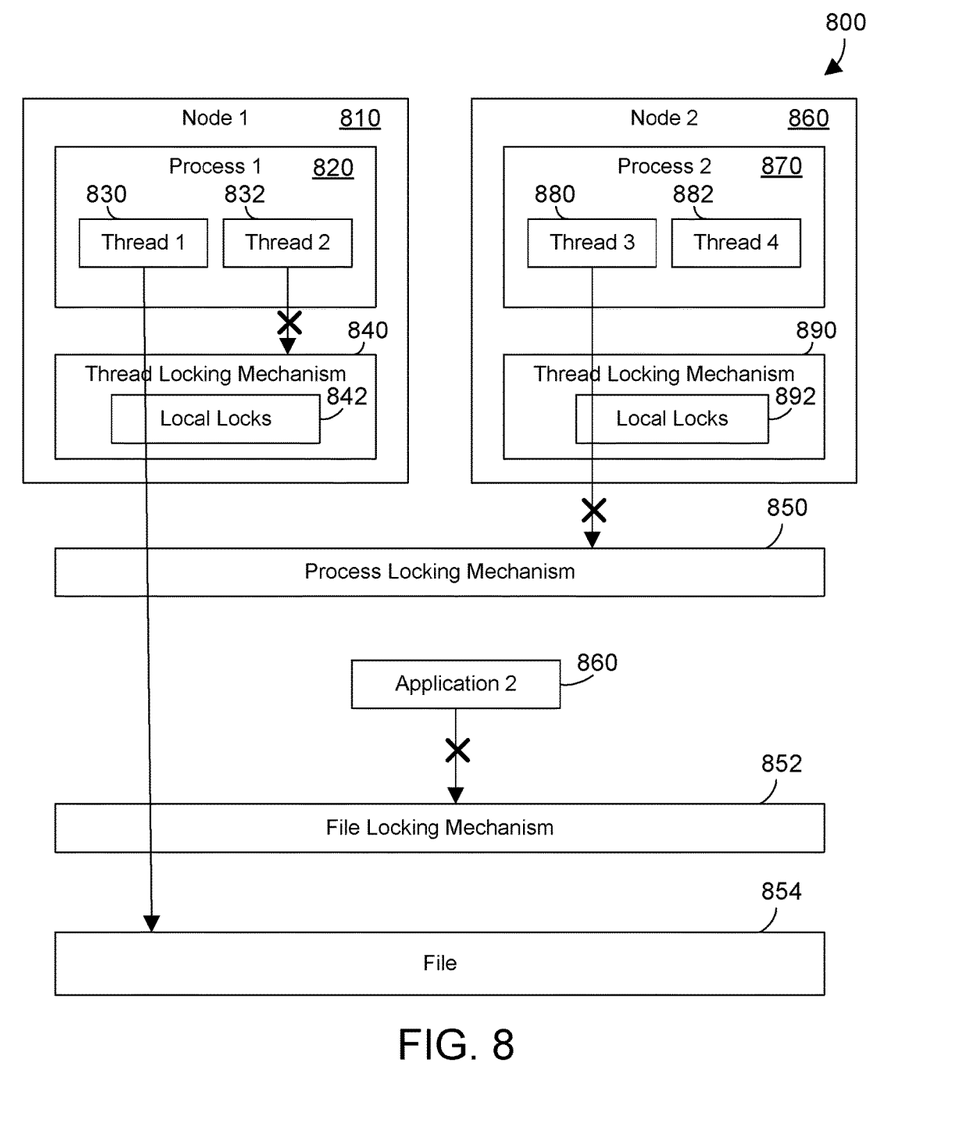
FIG. 8 is a block diagram showing function of the file locking service.

Referring to FIG. 8, a computer system 800 includes two nodes 810 and 860, which could each be an instance of computer system 100 shown in FIG. 1. Node 1 810 includes a first process 820 running two threads 830 and 832, and a thread locking mechanism 840 running with its local locks 842. Similarly, node 2 860 includes a second process 870 running two threads 880 and 882, and a thread locking mechanism 890 running with its local locks 892. A process locking mechanism 850 is used to provide locks between processes. An optional file locking mechanism 852 may be used to provide locks to protect against applications that are not using the file locking service.

Examples are now provided to illustrate the function of the computer system 800 in FIG. 8. We assume thread 1 830 in process 1 820 requests a lock for file 854 from the thread locking mechanism 840. The mutex lock for the local locks 842 is obtained, and we assume the inode corresponding to file 854 is not on the list of local locks 842, meaning the local lock is available. In response, the inode corresponding to the file 854 is written to the list of local locks 842, and the thread locking mechanism 840 requests the lock for file 854 from the process locking mechanism 850. We assume the inode corresponding to file 854 is not locked in the FCNTL locks (e.g., FIG. 6) for the process locking mechanism 850, so the FCNTL lock is obtained by the process locking mechanism for the inode corresponding to the file 854. Next, the process locking mechanism requests a lock of the inode corresponding to the file 854 from the file locking mechanism 852, which controls accesses to file 854 by different applications. Assuming the file 854 is not locked by a different application, the file locking mechanism 852 obtains the lock to the file 854, and returns the lock to thread 1 830. At this point Thread 1 830 has the lock on file 854 and can access file 854 as needed.

While thread 1 830 has file 854 locked, let's assume thread 2 832 requests a lock for file 854. Because the inode corresponding to the file 854 is on the list of local locks 842, the request for the lock by thread 2 832 fails, as shown by the X on the left side of FIG. 8. The thread locking mechanism 840 with its list of local locks thus effectively blocks attempts to access the same file by different threads within a process.

Now let's assume thread 3 880 in process 2 870 in node 2 860 attempts to get a lock on file 854 while thread 1 830 has its lock on file 854. The thread locking mechanism 890 checks its local locks 892 and determines there is no entry in the local locks 892 for the inode corresponding to file 854, so an entry is written to the local locks 892 for the inode corresponding to file 854. This means the local lock was successfully obtained by the thread locking mechanism 890 for file 854, because there were no other threads that had a lock on file 854 as shown in the local locks 892. Next, the thread locking mechanism 890 requests the lock for file 854 from the process locking mechanism 850. This means the temporary table for FCNTL usage, such as table 600 in FIG. 6, is read to see if there is a lock listed for the inode corresponding to the file 854. Because thread 1 830 obtained a lock from the process locking mechanism 850 for file 854, there will be an entry in the temporary table for the process locking mechanism 850 showing the lock for file 854 is not available. So the request for the lock from the process locking mechanism 850 fails, as shown by the X on the right side of FIG. 8. The multi-tiered locking service disclosed and claimed herein thus provides locking across threads, processes and applications, thereby providing an effective file locking scheme in a distributed environment, such as a cloud computing environment.

Next, let's assume an application 860 that does not use the file locking service attempts to access the file 854 while thread 1 830 has the lock on file 854. This attempted access to the file 854 will be blocked by the file locking mechanism 852, as shown by the X in the lower middle of FIG. 8. The file locking mechanism 852 provides a mandatory locking mechanism that cannot be bypassed by other applications that do not use the file locking service disclosed herein.

Figure 9:
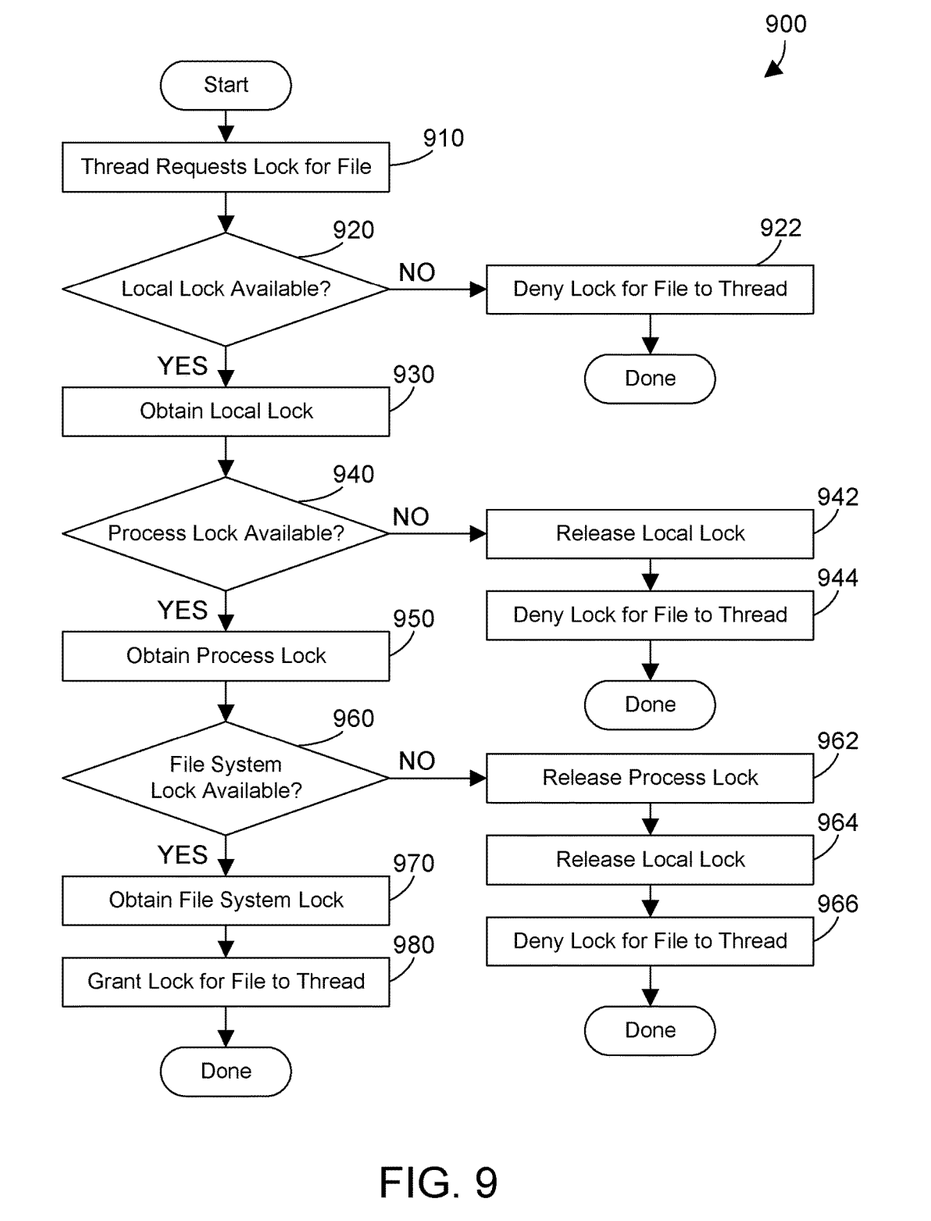
FIG. 9 is a flow diagram of a method for locking files using the file locking service.

Referring to FIG. 9, a method 900 is preferably performed by the file locking service 123 shown in FIG. 1. A thread requests a lock for a file (step 910). When a local lock for the file is not available (step 920=NO), the requested lock for the file by the thread is denied (step 922). Note that a local lock for the file is not available in step 920 when there is already a listing in the local locks for the file. When the local lock is available (step 920=YES), which means there is no listing in the local locks for the file, the local lock is obtained (step 930). The local lock may be obtained in step 930 by writing an entry to the local locks for the inode corresponding to the file. Next, a check is made to see if the process lock is available (step 940). If not (step 940=NO), the local lock is released (step 942) and the requested lock for the file to the thread is denied (step 944). When the process lock is available (step 940=YES), the process lock is obtained (step 950). The process lock may be obtained in step 950 by writing an entry to the FCNTL locks such as 600 in FIG. 6 that shows a lock for the inode corresponding to the file. Next, a check is made to see if the file system lock is available (step 960). If not (step 960=NO), the process lock is released (step 962), the local lock is released (step 964), and the requested lock for the file to the thread is denied (step 966). When the file system lock is available (step 960=YES), the file system lock is obtained (step 970), and the lock for the file to the thread is granted (step 980). While method 900 shown in FIG. 9 shows a particular sequence for obtaining the different locks, the sequence could be reordered within the scope of the disclosure and claims herein.

Figure 10:
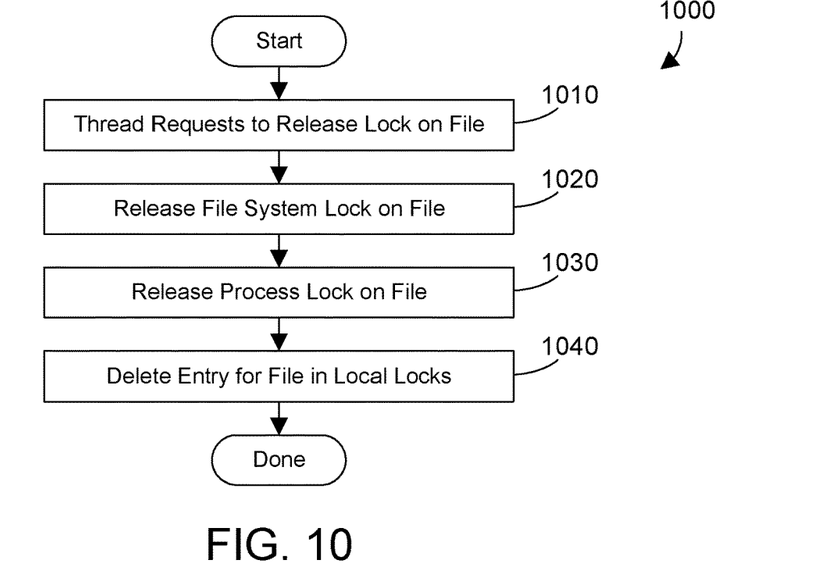
FIG. 10 is a flow diagram of a method for releasing a lock on a file.

Referring to FIG. 10, when a thread is finished working on a file, it releases the lock on the file. Method 1000 begins when a thread requests to release a lock on a file (step 1010). In response, the file system lock on the file is released (step 1020), the process lock on the file is released (step 1030), and the entry for the file in the local locks is deleted (step 1040). Note the sequence for releasing locks in FIG. 10 is the opposite of the sequence for obtaining the locks in method 900 in FIG. 9. One skilled in the art will recognize that if the sequence of obtaining locks in FIG. 9 changes, the sequence for releasing locks will also change so the releasing of locks is done in reverse order of the sequence of obtaining locks.

Figure 11:
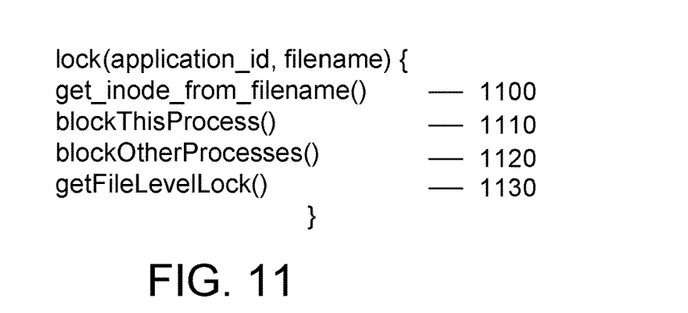
FIG. 11 is a diagram showing pseudo-code for a specific implementation of a lock method.

Pseudo-code is presented in FIGS. 11-14, which shows one suitable implementation for the locking service disclosed herein. FIG. 11 shows a lock( ) method that is called to lock a file to an application, where the application and filename are passes as parameters to the method call. The inode identifier is retrieved from the file at 1100. The method blockThisProcess( ) is then invoked at 1110, followed by blockOtherProcesses( ) at 1120 and getFileLevelLock( ) at 1130.

Figure 12:
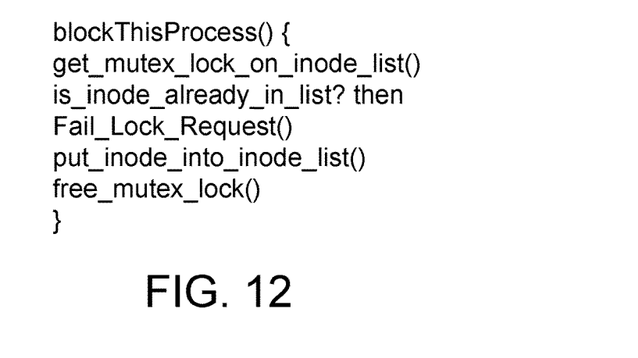
FIG. 12 is a diagram showing pseudo-code for a specific implementation of the blockThisProcess( ) method shown in FIG. 11.

One implementation for the blockThisProcess( ) method is shown in FIG. 12. A mutex lock on the inode list is obtained. When the inode is already in the inode list, the lock request fails. When the inode is not already in the inode list, the inode is put into the inode list, and the mutex lock is freed.

Figure 13:
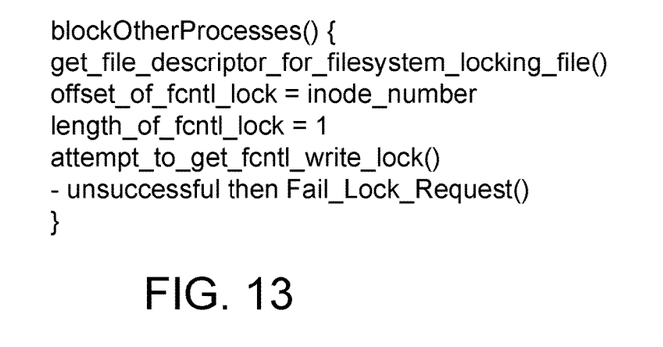
FIG. 13 is a diagram showing pseudo-code for a specific implementation of the blockOtherProcesses( ) method shown in FIG. 11.

One implementation for the blockOtherProcesses( ) method is shown in FIG. 13. The file descriptor for the filesystem locking file is retrieved, and an offset is the inode number of the file. If the attempt to get the lock is unsuccessful, meaning the lock is already set, then the lock request fails.

Figure 14:
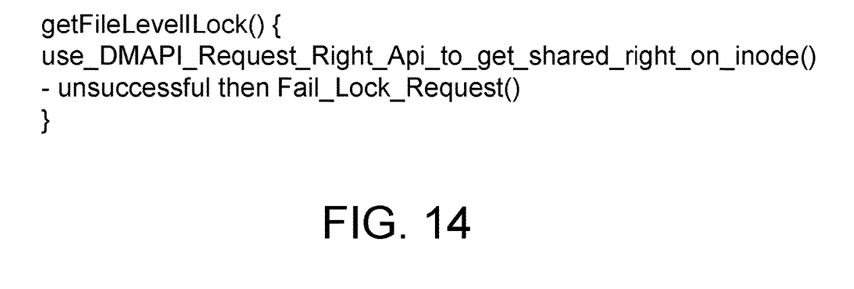
FIG. 14 is a diagram showing pseudo-code for a specific implementation of the getFileLevelLock( ) method shown in FIG. 11.

One implementation for the getFileLevelLock( ) method is shown in FIG. 14. The DMAPI request is made to obtain a shared right on the inode. If the DMAPI request is unsuccessful, the lock request fails. The lock request is only successful when the lock request does not fail in any of the blockThisProcess( ), blockOtherProcesses( ) and getFileLevelLock( ) methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A multi-tiered file locking service provides file locking at the thread and process level, and can optionally include locking at the file system level. A local locking mechanism maintains a list of local locks for threads within a process. When a thread requests a lock for a file, and a local lock is obtained, a process lock for the file may be requested. When no file system locking is used, when the process lock is obtained, the thread receives the lock for the file. When file system locking is used, when the process lock is obtained, a file system lock for the file may be requested. When the file system lock for the file is obtained, the thread receives the lock for the file. The result is a file locking service that functions across threads, processes and nodes in a distributed computing environment.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a file residing in the memory;
   a file locking service residing in the memory and executed by the at least one processor, the file locking service comprising:
     a thread locking mechanism that:
       maintains a list of local locks by threads for nodes in a distributed file system, wherein the list of local locks by threads comprises a list of files currently being processed by any thread of a process corresponding to the list of local locks, wherein access to the list of local locks by threads is controlled using a mutex lock;
       receives a request from a first thread for a lock of a file in the distributed file system;
       when a local lock corresponding to the file exists in the list of local locks, denies the request from the first thread for the local lock of the file;
       when the local lock corresponding to the file does not exist in the list of local locks, creates an entry corresponding to the file in the list of local locks, and requests a process lock for the file from a process locking mechanism, wherein the process lock for the file comprises a lock on a node number corresponding to the file in a table of locks maintained by the process executing the first thread;
     the process locking mechanism that:
       receives the request for the process lock for the file from the thread locking mechanism, and in response, when the process lock for the file is not available, denies the request for the process lock from the thread locking mechanism;
       when the process lock for the file is available, requesting a file system lock for the file from a file locking mechanism; and
     a file locking mechanism that:
       receives a request from the process locking mechanism for a file system lock for the file; and
       when the file system lock is available, the file locking mechanism grants the file system lock for the file to the process locking mechanism, which in turn grants the process lock for the file to the thread locking mechanism, which in turn grants the file system lock for the file to the first thread.

2. The apparatus of claim 1 wherein the file system lock comprises a lock on a node number corresponding to the file.

3. The apparatus of claim 1 wherein when the process locking mechanism denies the request for the lock from the thread locking mechanism, the thread locking mechanism deletes the entry corresponding to the file in the list of local locks.

4. The apparatus of claim 1 wherein when the file locking mechanism denies the request for the lock from the process locking mechanism, the process locking mechanism releases the process lock on the file and the thread locking mechanism deletes the entry corresponding to the file in the list of local locks.

5. The apparatus of claim 1 wherein when the first thread no longer needs to access the file, the first thread releases the file system lock for the file.

6. A computer-implemented method executed by at least one processor for providing a file locking service in a computer system, the method comprising:
   a thread locking mechanism maintaining a list of local locks by threads for nodes in a distributed file system, wherein the list of local locks by threads comprises a list of files currently being processed by any thread of a process corresponding to the list of local locks, wherein access to the list of local locks by threads is controlled using a mutex lock;
   the thread locking mechanism receiving a request from a first thread for a lock of a file in the distributed file system, and in response, performs the steps of:
      when a local lock corresponding to the file exists in the list of local locks, denying the request from the first thread for the local lock of the file;
      when the local lock corresponding to the file does not exist in the list of local locks:
         creating an entry corresponding to the file in the list of local locks; and
         requesting a process lock for the file from a process locking mechanism, wherein the process lock for the file comprises a lock on a node number corresponding to the file in a table of locks maintained by the process executing the first thread;
   the process locking mechanism, in response to receiving the request from the thread locking mechanism for the process lock for the file, performs the steps of:
      when the process lock is not available, denying the request for the process lock, and when the process lock is available, obtaining the process lock for the file;
      requesting a file system lock for the file from a file locking mechanism;
   the file locking mechanism, in response to receiving the request from the process locking mechanism for the file system lock for the file, performs the steps of:
      when the file system lock for the file is available, the file locking mechanism grants the file system lock for the file to the process locking mechanism, which in turn grants the process lock for the file to the thread locking mechanism, which in turn grants the file system lock of the file to the first thread.

7. The method of claim 6 wherein the file system lock comprises a lock on a node number corresponding to the file.

8. The method of claim 6 wherein when the request for the lock from the thread locking mechanism is denied, deleting the entry corresponding to the file in the list of local locks.

9. The method of claim 6 wherein when the request for the lock from the process locking mechanism is denied, releasing the process lock on the file and deleting the entry corresponding to the file in the list of local locks.

10. The method of claim 6 wherein when the first thread no longer needs to access the file, the first thread releasing the file system lock for the file.

11. A computer-implemented method executed by at least one processor for providing a file locking service in a computer system, the method comprising:
   maintaining a list of local locks by threads for nodes in a distributed file system, wherein the list of locks by threads comprises a list of files currently being processed by any thread;
   a thread locking mechanism performing the steps of:
      receiving a request from a first thread for a lock of a file in the distributed file system;
      controlling access to the list of local locks by threads using a mutex lock;
      when a local lock corresponding to the file exists in the list of local locks, denying the request from the first thread for the local lock of the file;
      when the local lock corresponding to the file does not exist in the list of local locks:
         creating an entry corresponding to the file in the list of local locks; and
         requesting from a process locking mechanism a process lock for the file that comprises a lock on a node number corresponding to the file in a table of locks maintained by the process executing the first thread;
   the process locking mechanism, in response to receiving the request from the thread locking mechanism for the process lock for the file, performs the steps of:
      when the process lock is not available, denying the request for the process lock, releasing the process lock on the file and deleting the entry corresponding to the file in the list of local locks; and
      when the process lock is available, obtaining the process lock for the file and requesting from a file locking mechanism a file system lock for the file;
   the filing locking mechanism, in response to receiving the request from the process locking mechanism for the file system lock for the file, performs the steps of:
      when the file system lock is not available, denying the request from the process lock for the file system lock; and
      when the file system lock is available, granting the file system lock to the process locking mechanism, which in turn grants the process lock for the file to the thread locking mechanism, which in turn grants the file system lock for the file to the first thread; and
      when the first thread no longer needs to access the file, the first thread releasing the file system lock for the file.

* * * * *